(12) United States Patent
Hayashi

(10) Patent No.: US 6,536,594 B2
(45) Date of Patent: Mar. 25, 2003

(54) VIBRATION DAMPING BUSHING WITH ENGAGING JAWS, AND ASSEMBLY INCLUDING THE BUSHING AND A BRACKET FOR MOUNTING THE BUSHING

(75) Inventor: Naoki Hayashi, Kasugai (JP)

(73) Assignee: Tokai Rubber Industries, Ltd., Komaki (JP)

(*) Notice: Subject to any disclaimer, the term of this patent is extended or adjusted under 35 U.S.C. 154(b) by 0 days.

(21) Appl. No.: 10/085,160

(22) Filed: Feb. 27, 2002

(65) Prior Publication Data

US 2002/0135115 A1 Sep. 26, 2002

(30) Foreign Application Priority Data

Mar. 21, 2001 (JP) ........................................ 2001-081452

(51) Int. Cl.[7] ................................................. F16F 15/08
(52) U.S. Cl. ...................... 207/33; 267/141; 267/153; 248/632
(58) Field of Search ..................... 267/33, 153, 141, 267/141.2; 248/560, 615, 632, 633, 634

(56) References Cited

U.S. PATENT DOCUMENTS 3,586,306 A * 6/1971 Reece et al. ................. 267/141
5,984,283 A * 11/1999 Tsuiki et al. .................. 267/33
6,199,844 B1 * 3/2001 McCormick et al. ........ 267/221

\* cited by examiner

*Primary Examiner*—Matthew C. Graham
(74) *Attorney, Agent, or Firm*—Burr & Brown

(57) ABSTRACT

A vibration damping bushing including an elastic body of generally cylindrical shape formed of an elastic material and having a bore through which there is inserted a shaft member whose vibration is to be damped, and an outer mounting surface which extends in an axial direction of the elastic body and at which the elastic body is fixed to a mounting bracket, wherein a plurality of engaging jaws are formed integrally with the elastic body, on respective peripheral portions of the outer flat mounting surface of the elastic body, such that the engaging jaws extend from the mounting surface and are elastically engageable with respective engaging portions of the mounting bracket, so that the elastic body is fixed to the mounting bracket.

11 Claims, 10 Drawing Sheets

VIBRATION DAMPING BUSHING WITH ENGAGING JAWS, AND ASSEMBLY INCLUDING THE BUSHING AND A BRACKET FOR MOUNTING THE BUSHING

This application claims the benefit of Japanese Patent Application No. 2001-081452, filed on Mar. 21, 2001, the entirety of which is incorporated herein by reference.

BACKGROUND OF THE INVENTION

1. Field of the Invention

The present invention relates in general to a vibration damping bushing and an assembly including the bushing, and more particularly to a mechanism for assembling the bushing and a mounting bracket together so as to improve the durability of the bushing.

2. Discussion of Related Art

A vibration damping bushing having a generally cylindrical shape has been employed for various applications, such that the bushing is interposed between two members, for connecting these members in a vibration damping manner. For example, such a generally cylindrical vibration damping bushing includes an elastic body formed of a rubber or elastic material and having a bore through which there is inserted a shaft member connected to one of the two members indicated above. The elastic body has an outer flat mounting surface extending in its axial direction (in which the bore extends). The bushing is connected to the other of the two members through a mounting bracket such that the elastic body is fixed to the mounting bracket at the above-indicated outer flat mounting surface. For instance, the generally cylindrical vibration damping bushing is used in an automotive vehicle, as a stabilizer bushing for elastically connecting a stabilizer bar to a body of the vehicle in a vibration damping fashion.

In the case of the stabilizer bushing, the bushing is fixed to a frame of the vehicle body through the mounting bracket, such that the bushing and the mounting bracket are fixed together as a unit. To this end, the bushing is provided with an integrally formed projection for insertion through a mounting hole formed through the mounting bracket, so that the bushing and the mounting bracket constitute an assembly.

Described in detail by reference to FIG. 9 showing a vibration damping bushing in the form of a stabilizer bushing 2, the bushing 2 consists of an elastic body 3 formed of a rubber material and having a generally cylindrical shape in transverse cross section, with a center bore 2a formed therethrough so as to extend in its axial direction, so that a stabilizer bar extends through the center bore 2a. Described more precisely, the outer profile of the elastic body 3 in the transverse cross section consists of an upper semicircle and a lower rectangle, which cooperate to take the form of a tunnel or a barrel-roof or Nissen hut, as shown in FIG. 9. The elastic body 3 has a lower flat mounting surface 2b extending in the axial direction, and an internal slit 2c which permits the stabilizer bar to be inserted into the center bore 2a in the radial direction of the center bore 2a. The elastic body 3 of the stabilizer bushing 2 has an integrally formed mounting projection 4 extending downwards from an intermediate portion of the lower flat mounting surface 2b. The mounting projection 4 has a frusto-conical head for insertion through a mounting hole 8 formed through an intermediate part of a top wall of a U-shaped portion of a mounting bracket 6. The top wall of the mounting bracket 6 has an upper bearing surface 6a for contact with the mounting surface 2b of the stabilizer bushing 2 (elastic body 3), when the stabilizer bushing 2 is fixed to the mounting bracket 6, with the mounting projection 4 being inserted through the mounting hole 8 with elastic deformation of the frusto-conical head of the projection 4, such that the shoulder surface of the mounting projection 4 which is adjacent to the frusto-conical head is held in contact with the edge of the lower open end of the mounting hole 8, as indicated in FIG. 10. Thus, the stabilizer bushing 2 and the mounting bracket 6 are fixed together as a unit or assembly, which is subsequently fixed to the vehicle body.

While the stabilizer bushing 2 is installed on the vehicle body, with the assembly of the stabilizer bushing 2 and the mounting bracket 6 being fixed at the mounting bracket 6 to a suitable member of the vehicle body, however, the elastic body 3 suffers from insufficient durability due to stress concentration on a portion of the mounting surface 2b around the fixed end of the mounting projection 4 inserted through the mounting hole 8 formed through the upper bearing surface 6a of the mounting bracket 6, when a load acts on the stabilizer bushing 2 in a direction toward the bearing surface 6a due to a relative displacement between the stabilizer bar inserted through the center bore 2a of the stabilizer bushing 2 and the member of the vehicle body to which the mounting bracket 6 is fixed. The stress is concentrated on the portion of the mounting surface 2b around the fixed end of the projection 4, in the presence of the mounting hole 8, since the above-indicated portion of the mounting surface 2b is located adjacent to the edge of the upper open end of the hole 8 and is forced into the upper end portion of the hole 8 upon application of the load on the elastic body 3 in the direction toward the bearing surface 6a. Accordingly, the elastic body 3 tends to suffer from cracking at the portion of the mounting surface 2b around the fixed end of the mounting projection 4, leading to a risk of fracture of the projection 4 during the use of the stabilizer bushing 2 for a long time.

SUMMARY OF THE INVENTION

It is therefore a first object of the present invention to provide a vibration damping bushing having improved durability, without a risk of cracking or other damages due to a load acting on the bushing in a direction toward a mounting bracket. A second object of this invention is to provide an assembly of a vibration damping bushing and a mounting bracket, which assembly is improved in its durability without a risk of such damages of the bushing as described above.

The first object indicated above may be achieved according to a first aspect of this invention, which provides a vibration damping bushing including an elastic body of generally cylindrical shape formed of an elastic material and having a bore through which there is inserted a shaft member whose vibration is to be damped, and an outer mounting surface which extends in an axial direction of the elastic body and at which the elastic body is fixed to a mounting bracket, the vibration damping bushing comprising a plurality of engaging jaws formed integrally with the elastic body, on respective peripheral portions of the outer flat mounting surface of the elastic body, such that the engaging jaws extend from the mounting surface and are elastically engageable with respective engaging portions of the mounting bracket, so that the elastic body is fixed to the mounting bracket.

In the vibration damping bushing constructed as described above according to the first aspect of the present invention, the engaging jaws of the elastic body are not formed on a central portion of the outer flat mounting surface, but are formed on respective peripheral portions of the mounting surface, for engagement with the respective engaging portions of the mounting bracket. Accordingly, a bearing surface of the mounting bracket for contact with the mounting surface of the elastic body of the present bushing does not have a mounting hole which would cause a stress concentration on the mounting surface of the elastic body, due to a compressive load acting on the bushing fixed to the mounting bracket, upon application of a vibrational load between the shaft member inserted through the bushing and the mounting bracket. The engaging jaws are held in engagement with the respective engaging portions of the mounting bracket, under elastic forces of the engaging jaws owing to the elasticity of their elastic material, which elastic forces act on the surfaces of the engaging portions in a lateral direction parallel to the bearing surface, such that the engaging jaws are freely movable relative to the mounting bracket in the lateral direction away from the engaging portions, when the compressive load is applied to the present vibration damping bushing in the direction perpendicular to the above-indicated lateral direction. Thus, the engaging jaws are arranged to effectively prevent a stress concentration on the mounting surface of the elastic body and a consequent problem of cracking or other damage, thereby assuring improved durability of the bushing.

According to one preferred form of the vibration damping bushing of this invention, the outer flat mounting surface of the elastic body is a generally rectangular surface, and the plurality of engaging jaws consist of four engaging jaws formed at respective four corner portions of the generally rectangular surface. In this form of the bushing, the elastic body can be fixed to the mounting bracket with high stability, by engagement of the four engaging jaws with the respective four engaging portions of the bracket.

According to a second preferred form of the vibration damping bushing of the present invention, each of the engaging jaws includes a leg portion formed integrally with the elastic body, so as to extend from the outer flat mounting surface, and a hook portion extending from a free end face of the leg portion. In this case, the hook portion has a free end face inclined at a portion thereof on an inner side of the mounting surface, to provide a slant surface which is inclined toward the mounting surface as the slant surface extends inwardly of the mounting surface as seen in a plane parallel to the mounting surface, and the hook portion is engageable with a corresponding one of the engaging portions of the mounting bracket, by a relative movement of the engaging jaw and the corresponding engaging portion while the slant surface is in sliding contact with a surface of the corresponding engaging portion. The engaging jaws each including the leg portion and the hook portion can be easily brought into engagement with the respective engaging portions of the mounting bracket, thereby facilitating an operation to assemble the vibration damping bushing and the mounting bracket into an assembly.

In one advantageous arrangement of the second preferred form of the bushing described above, each engaging jaw further includes a reinforcing block formed integrally with the elastic body and the leg portion, so as to reinforce the leg portion, and the hook portion is formed on only the free end face of the leg portion. In the presence of the reinforcing block formed integrally with the leg portion, the leg portion is effectively reinforced so as to maintain the engaging jaw in engagement with the corresponding engaging portion of the mounting bracket with the elasticity of the leg and hook portions as well as the elasticity of the reinforcing block.

According to a third preferred form of the vibration damping bushing of the invention, the elastic body of generally cylindrical shape has an outer surface cooperating with the outer flat mounting surface to define an outer profile as seen in a plane perpendicular to the axial direction of the elastic body, and the elastic body further has an internal slit formed therethrough in a radial direction thereof, so as to extend in parallel with the outer flat mounting surface, between an inner circumferential surface of the bore and the above-indicated outer surface. The internal slit is formed over an entire axial length of the elastic body. This internal slit permits the shaft member to be fitted into the bore in the radial direction, such that the portions of the elastic body which define the slit are elastically deformed in the opposite directions so as to generate an inlet opening which communicates with the bore and which is large enough to permit the shaft member to be forced into the bore in the radial direction The vibration damping bushing of the present invention is advantageously used as a stabilizer bushing on an automotive vehicle. In this case, a stabilizer bar provided as the shaft member is inserted through the bore of the elastic body of the stabilizer bushing.

According to a fourth preferred form of the vibration damping bushing of the invention, the plurality of engaging jaws of the elastic body are positioned relative to each other and dimensioned such that the engaging jaws are elastically deformed in sliding contact with surfaces of the engaging portions of the mounting bracket, when the elastic body and the mounting bracket are moved toward each other each other in a direction perpendicular to the outer flat mounting surface, for engagement of the engaging jaws with the respective engaging portions.

The second object indicated above may be achieved according to a second aspect of the present invention, which provides an assembly consisting of a vibration damping bushing according to the first aspect of this invention described above, and a mounting bracket having a plurality of engaging portions with which the plurality of engaging jaws of the elastic body are engageable, so that the elastic body and the mounting bracket are fixed to each other.

The assembly according to the second aspect of the invention has substantially the same advantages as the vibration damping bushing according to the first aspect of the invention described above. Further, the vibration damping bushing can be easily attached to a desired member such as the body of an automotive vehicle, by simply fixing the mounting bracket to the desired member, since the bushing and the mounting bracket constitute an integral assembly, that is, since the bushing has been firmly fixed to the mounting bracket.

According to one preferred form of the assembly according to the second aspect of this invention, the mounting bracket consists of a top wall portion and a pair of supporting leg portions, and the top wall portion has a bearing surface for contact with the outer flat mounting surface of the elastic body, and a generally rectangular shape as seen in a first plane parallel to the outer flat mounting surface. Each L-shaped supporting leg portion is L-shaped as seen in a second plane perpendicular to the above-indicated first plane, and the pair of L-shaped supporting leg portions extend from respective opposite ends of the top wall portion, in a symmetric relation with each other. Each L-shaped supporting leg portion consists of a vertical section extending downwards from a corresponding one of the opposite ends of the top wall portion, as seen in the second plane, and a horizontal section extending from a free end of the vertical section such that the horizontal sections of the pair of L-shaped supporting leg portions extend in opposite directions away from each other, in parallel with the top wall portion. In this instance, the plurality of engaging portions consist of four engaging portions formed at respective four corners of the generally rectangular top wall portion. In this form of the assembly, the vibration damping bushing is supported by the generally rectangular top wall portion of the mounting bracket, and the four engaging jaws formed on the mounting surface of the elastic body of the bushing are held in engagement with the respective engaging portions formed at the respective four corners of the generally rectangular top wall portion of the mounting bracket, so that the bushing can be firmly fixed to the mounting bracket.

According to one advantageous arrangement of the above-indicated preferred form of the assembly of the invention, the four engaging portions consist of four arcuate cutouts formed at the respective four corners of the top wall portion, and the plurality of engaging jaws of the elastic body consist of four engaging jaws which are held in engagement with the four arcuate cutouts, respectively, such that a free end portion of each of the four engaging jaws is partially located inwardly of a corresponding one of the arcuate cutouts as seen in the above-indicated first plane, and is held in contact with a part of a surface of the top wall portion opposite to the bearing surface, which part is adjacent to the corresponding one arcuate cutout. In this arrangement, the engaging jaws can be easily brought into engagement with the respective engaging portions in the form of the arcuate cutouts formed at the respective corner portions of the generally rectangular top wall portion of the mounting bracket, so that the bushing and the bracket can be easily assembled together.

The assembly according to the second aspect of this invention may consist of a stabilizer bushing as the vibration damping bushing, and the mounting bracket. In this case, the shaft member is a stabilizer bar provided on an automotive vehicle.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which.

DETAILED DESCRIPTION OF THE PREFERRED EMBODIMENTS

Figure 1:
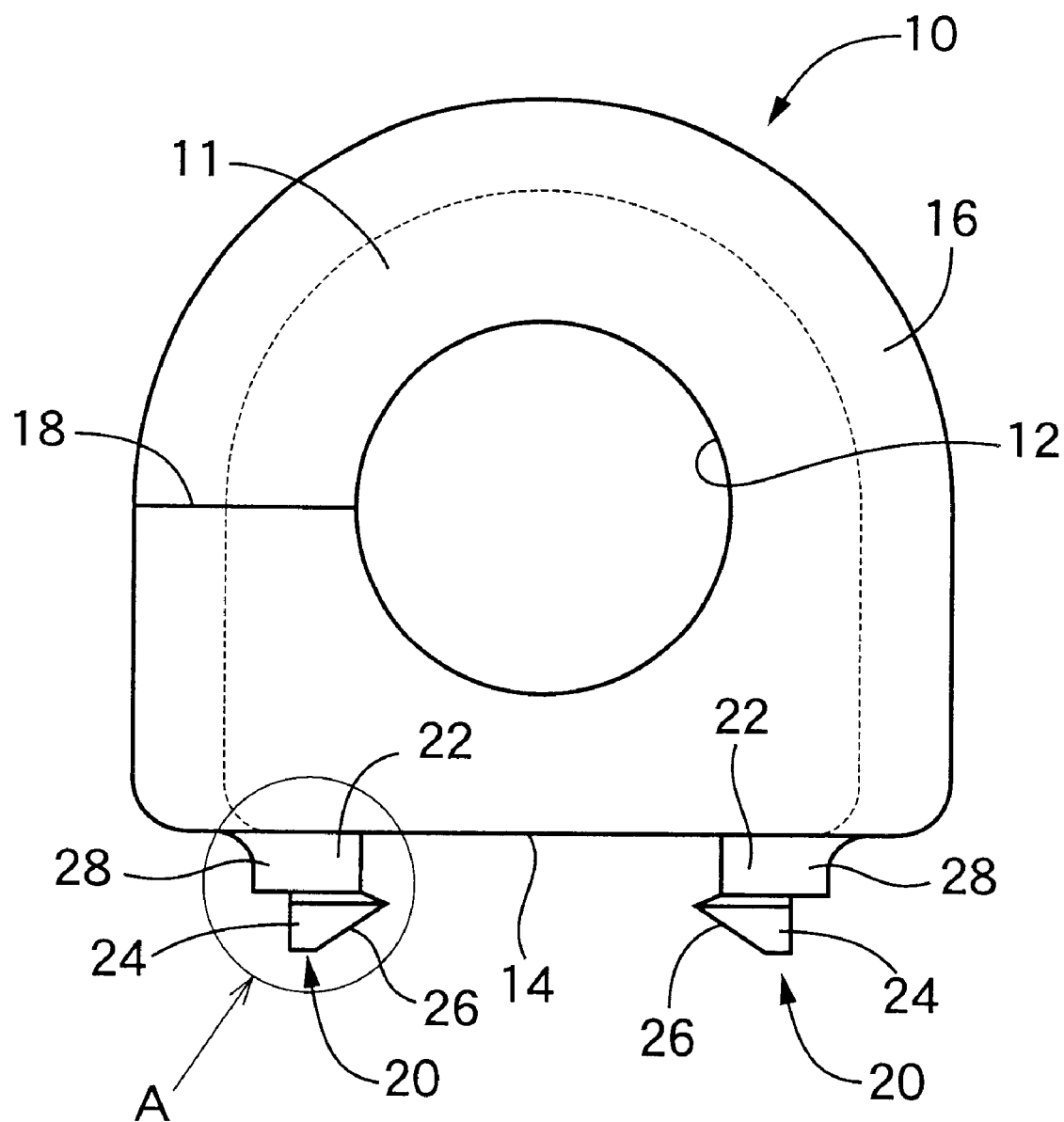
FIG. 1 is a front elevational view of a vibration damping bushing in the form of a stabilizer bushing constructed according to one embodiment of this invention.
Figure 2:
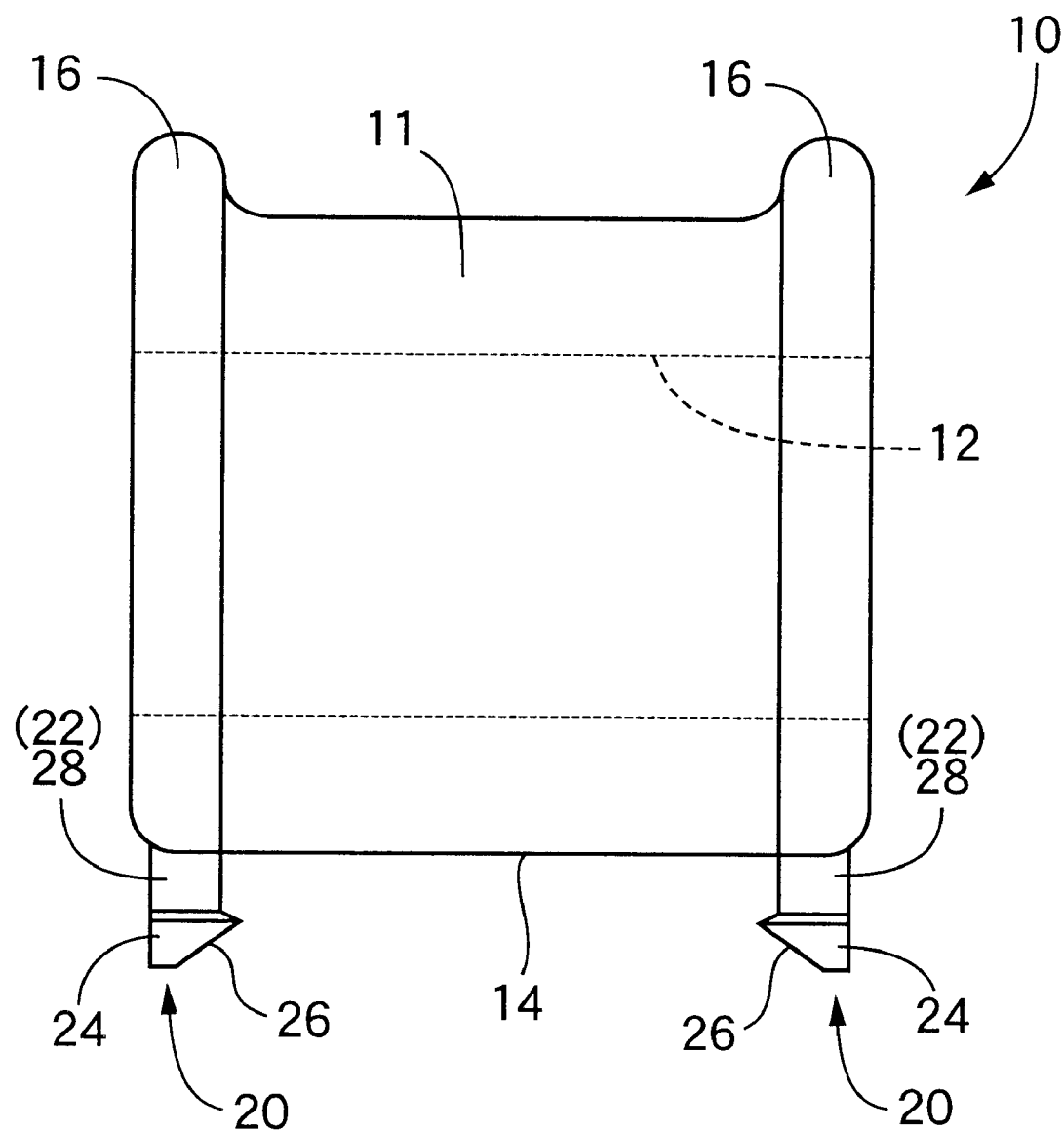
FIG. 2 is a right-side elevational view of the stabilizer bushing of FIG. 1.
Figure 3:
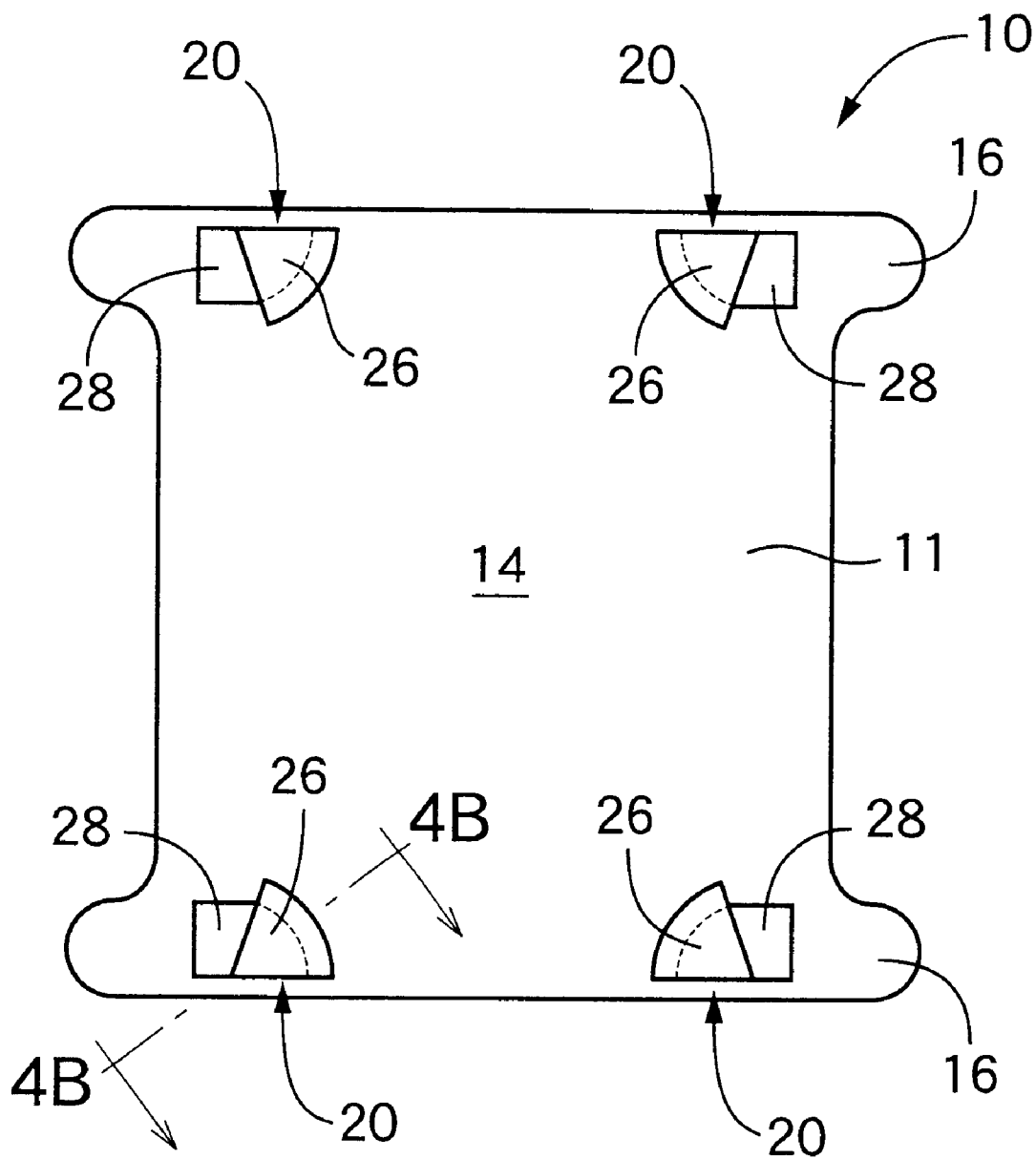
FIG. 3 is a bottom plan view of the stabilizer bushing of FIG. 1.

Referring first to the front elevational view of FIG. 1, the right-side elevational view of FIG. 2 and the bottom plan view of FIG. 3, there is shown a vibration damping bushing in the form of a stabilizer bushing 10 constructed according to one embodiment of this invention.

As is apparent from FIGS. 1–3, the stabilizer bushing 10 consists of an elastic body 11 formed of a rubber or elastic material, like the known stabilizer bushing. The elastic body 11 has a generally cylindrical shape in transverse cross section, with a center bore 12 formed therethrough so as to extend in its axial direction, so that a stabilizer bar whose vibration is to be damped extends through the center bore 12. Described more precisely, the outer profile of the elastic body 11 in the transverse cross section consists of an upper semicircle and a lower rectangle, which cooperate with each other to take the form of a tunnel or a barrel-roof or Nissen hut, as seen in the front elevational view of FIG. 1. The elastic body 11 has a lower or bottom surface in the form of a flat mounting surface 14 extending in the axial direction. As shown in FIG. 2, the tunnel-shaped elastic body 11 has a pair of opposed rims 16 formed at the respective axial ends, except on the flat mounting surface 14. The opposed rims 16 are opposed to each other in the axial direction of the elastic body 11, and have a suitable height from the axially intermediate portion of the elastic body 11. As shown in FIG. 1, the elastic body 11 has an internal slit 18 formed therethrough in the radial direction of the center bore 12, so as to extend in parallel with the mounting surface 14, between an inner circumferential surface of the center bore 12 and a part of the outer surface between the adjacent ends of the above-indicated semicircle and rectangle of the tunnel-like outer profile of the elastic body 11 as seen in a plane perpendicular to its axial direction. The slit 18 is formed over the entire axial length of the elastic body.

Figure 4A:
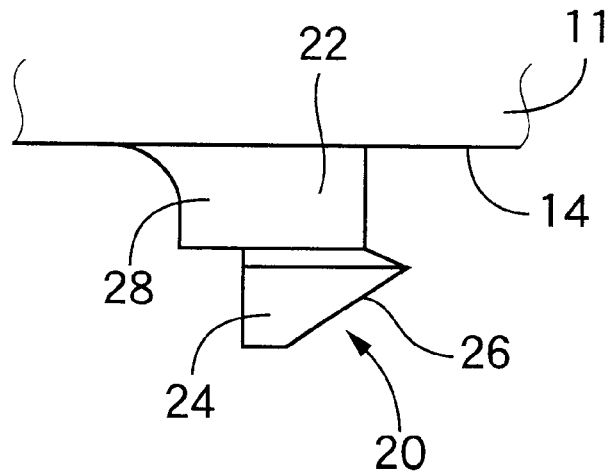
FIG. 4A is an enlarged view of an engaging jaw portion of the stabilizer bushing, which is indicated at A in FIG. 1.
Figure 4B:
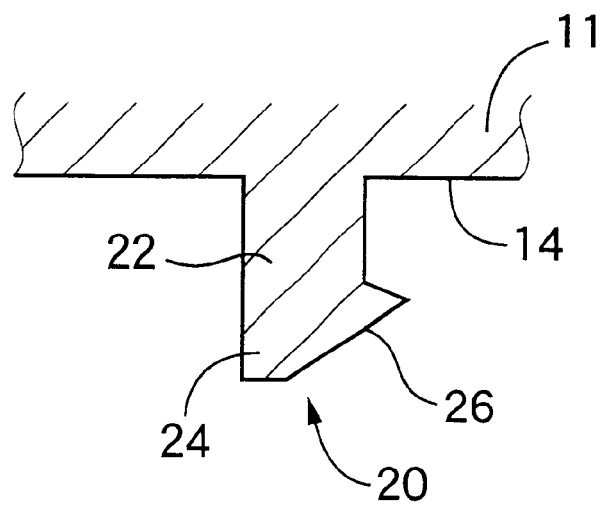
FIG. 4B is an enlarged cross sectional view taken along line 4B—4B in FIG. 3.

As shown in FIG. 3, the lower flat mounting surface 14 of the elastic body 11 of the stabilizer bushing 10 has a generally rectangular shape. The elastic body 11 has four integrally formed engaging jaws 20 located at respective peripheral or corner portions of the rectangular mounting surface 14. The four engaging jaws 20 are formed as integral parts of the elastic body 11, so as to extend outwardly of the elastic body 11, that is, extend downwards from the lower mounting surface 14, as shown in FIGS. 1–3. Namely, the engaging jaws 20 are formed of the same rubber material as the elastic body 11, and are therefore elastically deformable. Described more specifically by reference to the enlarged views of FIGS. 4A and 4B, each of the engaging jaws 20 consists of a leg portion 22 formed integrally with the elastic body 11 so as to extend from the mounting surface 14, and a hook portion 24 extending from the free or lower end face of the leg portion 22. The leg portion 22 has a sectorial shape in cross section in a plane parallel to the mounting surface 14. The lower end face of the hook portion 24 is inclined at a portion thereof on an inner side of the mounting surface 14 (as seen in FIG. 4), to provide a slant surface 26 which is inclined toward the mounting surface 14 (as seen in FIGS. 1 and 2) as the slant surface 26 extends inwardly of the mounting surface 14 as seen in FIGS. 1–3, that is, as seen in a plane parallel to the mounting surface 14. The slant surface 26 has a sectorial shape as seen in FIG. 3. The hook portions 24 having the respective slant surfaces 26 extending toward a central portion of the mounting surface 14 are partially located inwardly of the respective leg portions 22, that is, located nearer to the central portion of the mounting surface 14, than the leg portions 22, as seen in FIG. 3. Each of the hook portions 24 has an arcuate surface corresponding to the arc of the sector of the slant surface 26. The leg portion 22 of each engaging jaw 20 is formed integrally with a reinforcing block 28 having a rectangular shape in cross section in the plane parallel to the mounting surface 14. The reinforcing block 28 has the same height as the leg portion 22, and cooperates with the leg portion 22 to constitute an integral base of the engaging jaw 20. As shown in FIGS. 1 and 3, the hook portion 24 is formed on only the leg portion 22 of the integral base.

Figure 5A:
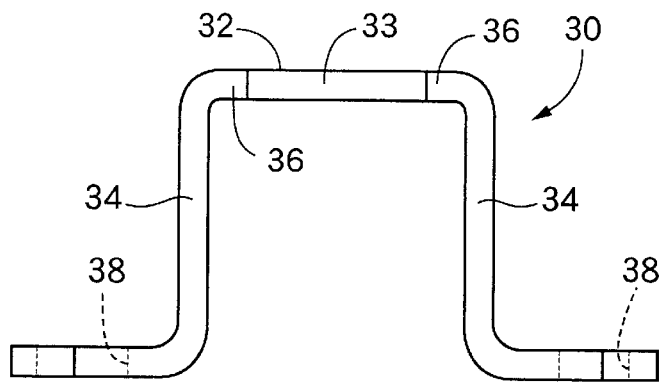
FIG. 5A is a front elevational view of a mounting bracket to which the stabilizer bushing of FIG. 1 is fixed.
Figure 5B:
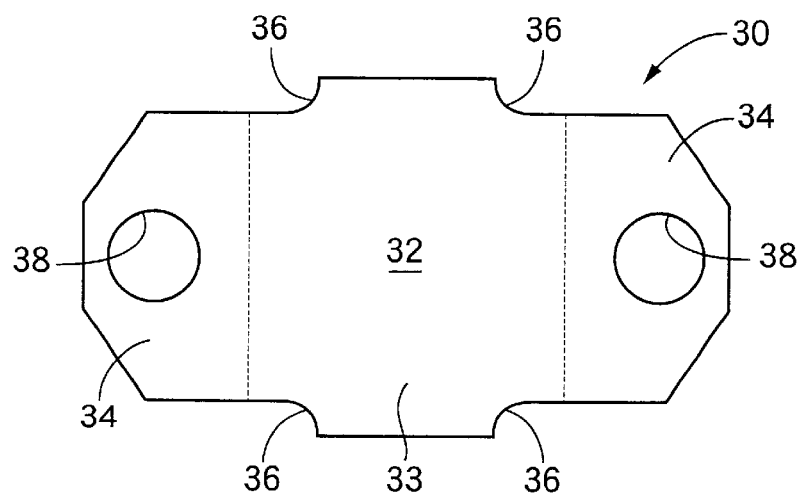
FIG. 5B is a plan view of the mounting bracket of FIG. 5A.
Figure 5C:
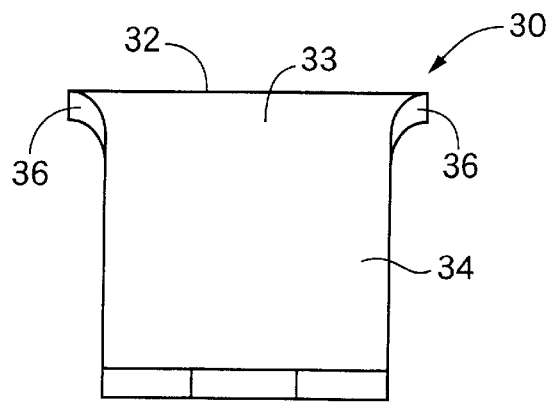
FIG. 5C is a right-side elevational view of the mounting bracket of FIG. 5A.
Figure 7:
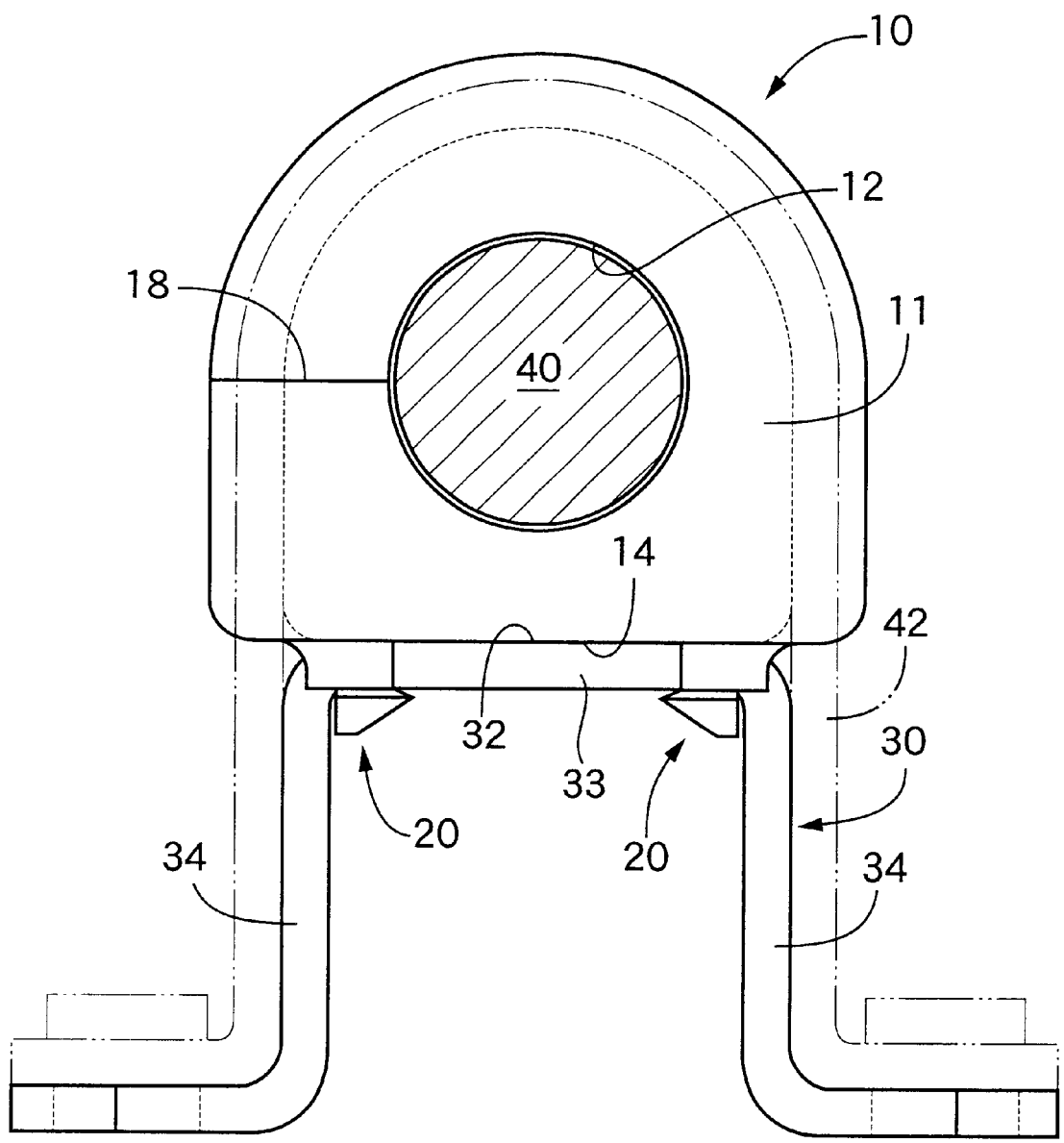
FIG. 7 is a front elevational view of an assembly of the stabilizer bushing and the mounting bracket, as installed on a vehicle.
Figure 8:
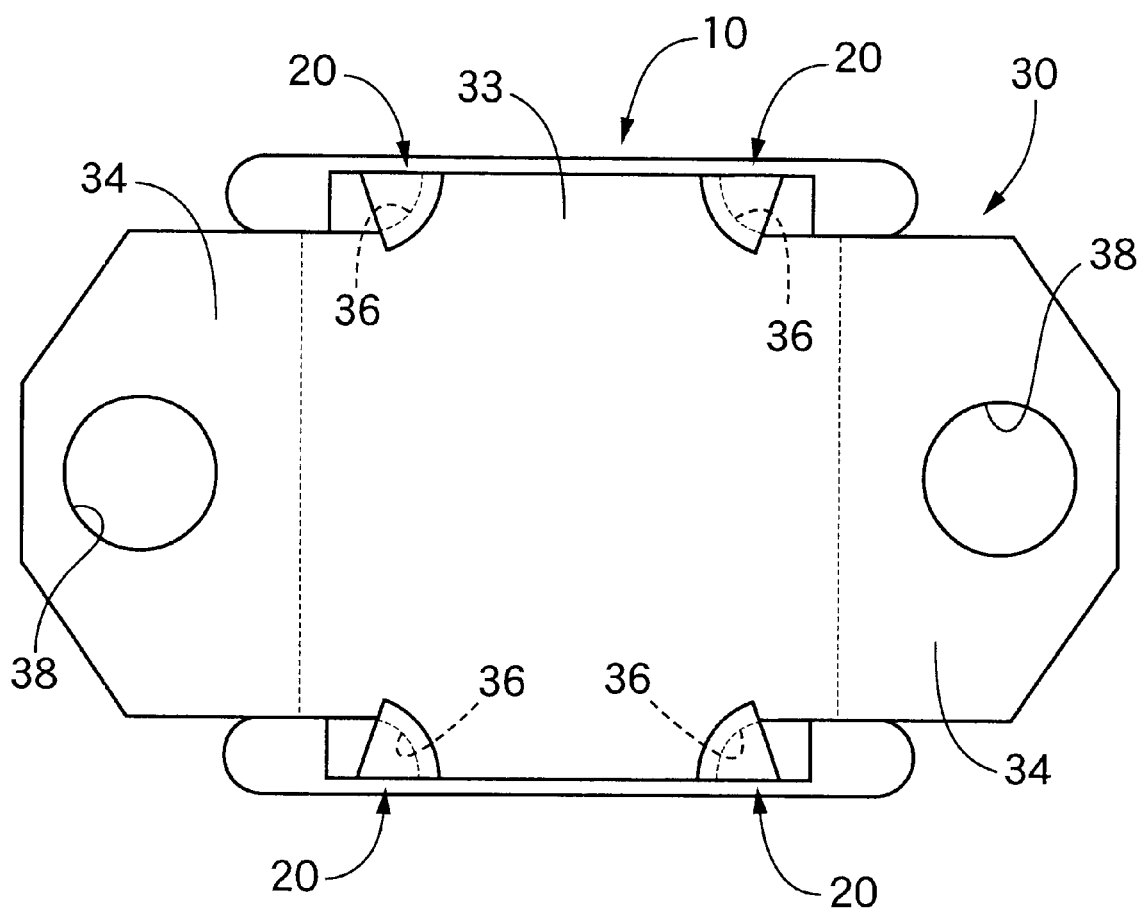
FIG. 8 is a bottom plan view of the assembly of the stabilizer bushing and the mounting bracket, showing the engagement of the engaging jaw portions of the bushing with the respective cutouts formed in a top plate portion of the bracket.
Figure 9:
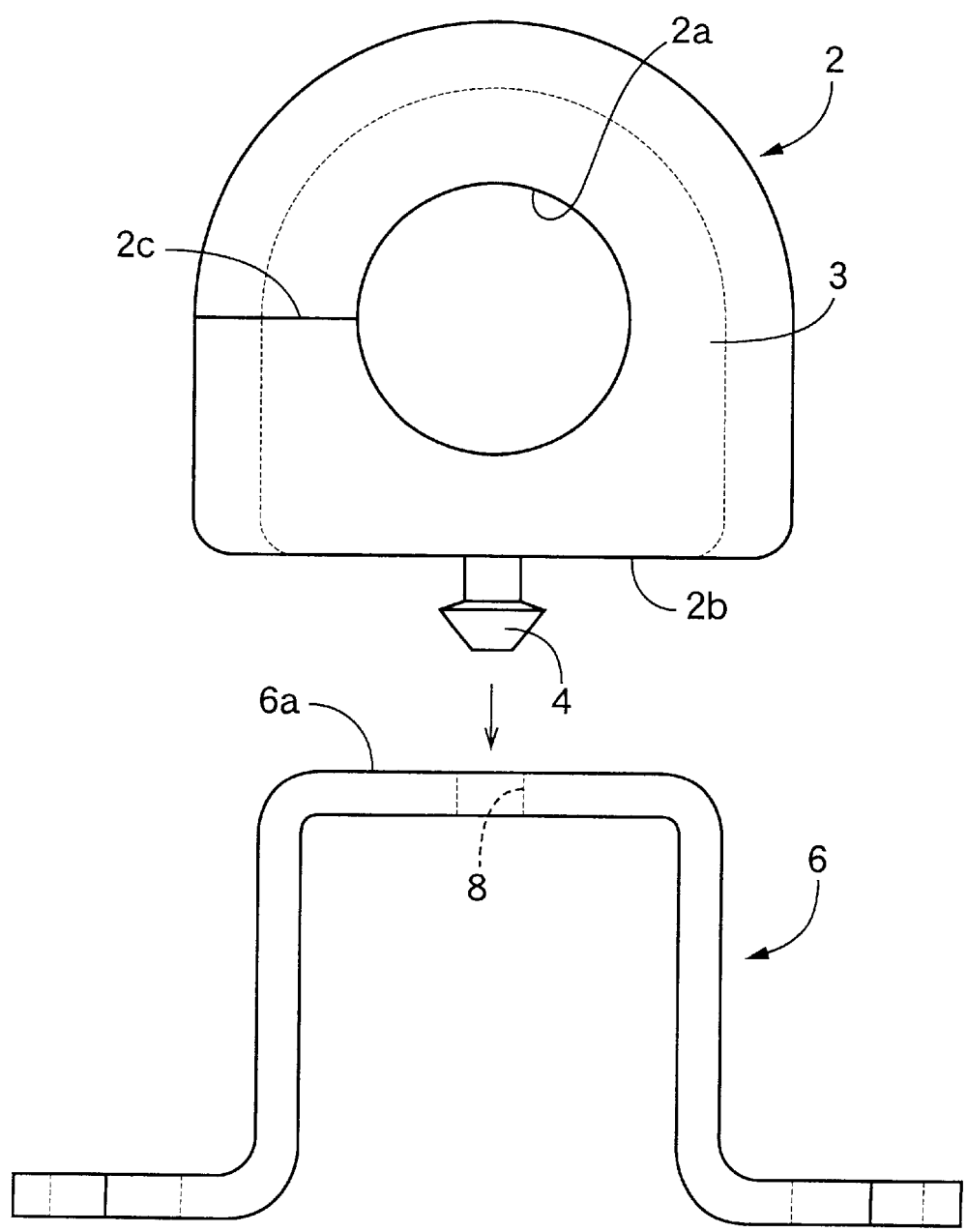
FIG. 9 is a front elevational view of a known assembly of a stabilizer bushing and a mounting bracket.
Figure 10:
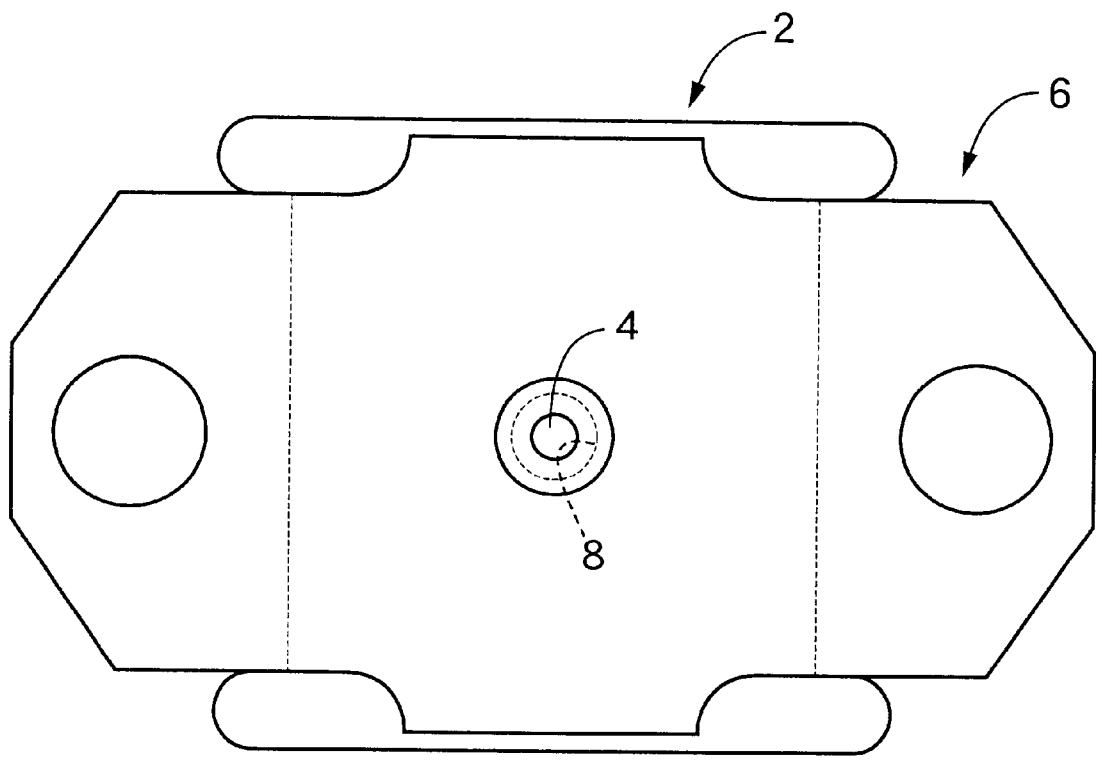
FIG. 10 is a bottom plan view of the assembly of FIG. 9 of the stabilizer bushing and the mounting bracket.

The stabilizer bushing 10 thus constructed is fixed to a mounting bracket 30 as shown in FIGS. 5A, 5B and 5C, to provide an integral assembly consisting of the bushing 10 and the bracket 30, as shown in FIG. 7. The mounting bracket 30 is formed by bending a metallic sheet such as a steel sheet having suitable length, width and thickness dimensions. As shown in FIG. 5A, the mounting bracket 30 is a generally U-shaped structure including a top wall portion 33 and a pair of supporting leg portions 34 which have a smaller width than the top wall portion 33. The top wall portion 33 has a generally rectangular shape as seen in FIG. 5B, and each of the L-shaped supporting leg portions 34 is L-shaped as seen in FIG. 5A. The two leg portions 34 extend from the respective opposite ends (right and left ends) of the top wall portion 33, in a symmetric relation with each other. The top wall portion 33 has a flat bearing surface 32 for contact with the flat mounting surface 14 of the elastic body 11 of the stabilizer bushing 10. Each of the L-shaped supporting leg portions 34 consists of a vertical section extending downwards from the corresponding right or left end of the top wall portion 33, as seen in FIG. 5A, and a horizontal section extending from the free or lower end of the vertical section such that the horizontal sections of the two L-shaped supporting leg portions 34 extend in the opposite directions away from each other, in parallel with the top wall portion 33. The top wall portion 33 having the bearing surface 32 has four engaging portions in the form of arcuate cutouts 36 formed at respective four corners of the rectangle such that the arcuate cutouts 36 are contiguous with the upper end portions of the respective side faces of the vertical sections of the two L-shaped supporting leg portions 34, as shown in FIGS. 5B and 5C. The horizontal sections of the two supporting leg portions 34 have respective mounting holes 38, as shown in FIGS. 5A and 5B. The mounting bracket 30 is fixed to a suitable member of the vehicle body with bolts or the like inserted through the mounting holes 38.

Figure 6:
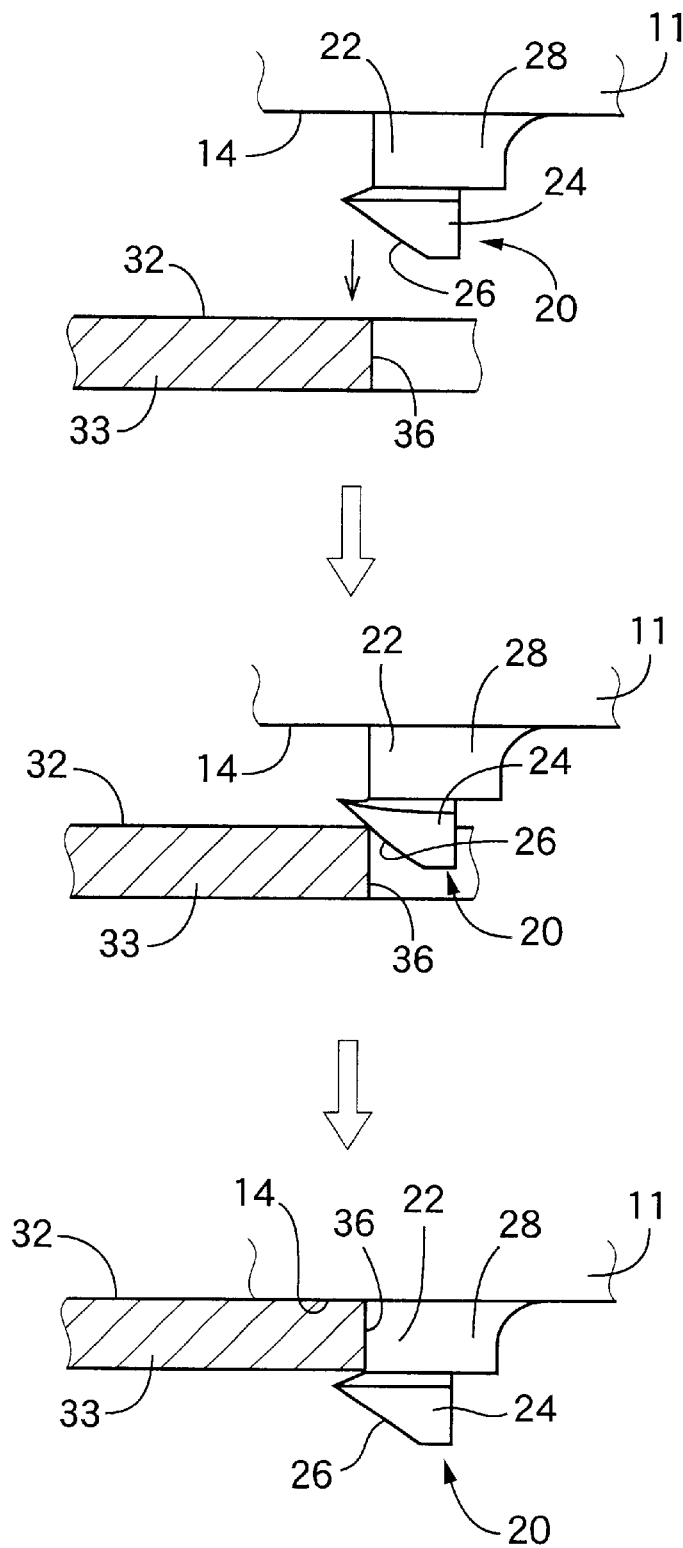
FIG. 6 is a view for explaining a procedure to effect engagement of the engaging jaw portion of an elastic body of the stabilizer bushing with an engaging portion in the form of a cutout of the mounting bracket.

When the stabilizer bushing 10 and mounting bracket 30 which are constructed as described above are assembled together, the stabilizer bushing 10 and the mounting bracket 30 are first positioned such that the mounting surface 14 and the bearing surface 32 are opposed to each other. Then, the stabilizer bushing 10 and the mounting bracket 30 are moved toward each other, as shown in FIG. 6, such that the hook portion 24 of each of the four engaging jaws 20 provided at the respective peripheral portions, more precisely, at respective four corner portions of the mounting surface 14 of the stabilizer bushing 10 is brought into engagement at its slant surface 36 with the corresponding one of the four arcuate cutouts 36 formed at the respective four corners of the top wall portion 33 of the mounting bracket 30. More precisely described, the slant surface 36 is brought into abutting contact with the edge of the corresponding arcuate cutout 36. In this state, the stabilizer bushing 10 and the mounting bracket 30 are further moved toward each other. This relative movement causes elastic deformation of the hook portion 24 and the leg portion 22 of the engaging jaw 20, in a direction perpendicular to the direction of the relative movement, that is, in the right direction as seen in FIG. 6, such that the slant surface 26 is moved in sliding contact with the upper edge of the arcuate cutout 36 and the surface of the arcuate cutout 36. The hook portion 24 is finally located below the lower edge of the arcuate cutout 36, with elastic deformation of the engaging jaw 20 in the reverse direction, so that the extreme end of the slant surface 26 which is nearest to the lower surface of the top wall portion 33 is located inwardly of the arcuate cutout 36, that is, on the left side of the cutout 36 as seen in FIG. 6. That is, the hook portion 24 is partially located inwardly of the corresponding arcuate cutout 36 as seen FIG. 5B, and is held in contact with the lower surface of the top wall portion 33, at a point near the arcuate cutout 36. As a result, the stabilizer bushing 10 and the mounting bracket 30 are fixed together into an assembly as shown in FIG. 7. For firm engagement between the engaging jaw 20 and the arcuate cutout 36, the height of the leg portion 22 of each engaging jaw 20 is substantially equal to the thickness of the top wall portion 33 of the mounting bracket 30.

The assembly of the stabilizer bushing 10 and the mounting bracket 30 is handled as a unit when the stabilizer bushing 10 is fixed to the frame of the vehicle body through the mounting bracket 30. That is, the assembly is bolted to the vehicle body frame, using the mounting holes 38 formed through the L-shaped supporting leg portion 34 of the mounting bracket 30. At this time, a stabilizer bar 40 is inserted into the center bore 12 in the radial direction of the center bore 12, by utilizing the slit 18 which is formed through the elastic body 11, that is, by separating the relevant portions of the elastic body 11 from each other at the slit 18. Namely, these portions of the elastic body 11 are elastically deformed in the upward and downward directions so as to generate an inlet opening which communicates with the center bore 12 and which is large enough to permit the stabilizer bar 40 to be forced into the center bore 12 in the radial direction of the stabilizer bar 40. For preventing the stabilizer bar 40 from being removed from the stabilizer bushing 10, a fixing bracket 42 is provided to fix the stabilizer bushing 10 to the mounting bracket 30. The fixing bracket 42 is a generally U-shaped structure including an arcuate portion corresponding to an arcuate portion of the elastic body 11, and a pair of opposed L-shaped portions each having a horizontal section corresponding to the horizontal section of each L-shaped supporting leg portion 34 of the mounting bracket 30. The arcuate portion of the fixing bracket 42 is fitted on a part-circumferential outer surface of the elastic body 11, which is located between the two rims 16, 16. The fixing bracket 42 is fixed at its horizontal sections to the frame of the vehicle body together with the mounting bracket 30.

In the stabilizer bushing 10 installed at a suitable position on the vehicle, the engaging jaws 20 for engagement with the mounting bracket 30 are disposed at the respective four peripheral or corner portions of the mounting surface 14, and formed integrally with the elastic body 11. The stabilizer bushing 10 is fixed to the top wall portion 33 of the mounting bracket 30, with the engaging jaws 20 held in engagement with the arcuate cutouts 36, and is supported at its lower flat mounting surface 14 by the upper flat bearing surface 32 of the top wall portion 33. An input vibrational load applied to the stabilizer bushing 10 is received by the flat bearing surface 32 of the mounting bracket 30, without a stress concentration at any portion of the mounting surface 14.

The engaging jaws 20 extending downwards from the elastic body 11 are held in engagement with the arcuate cutouts 36 of the mounting bracket 30, under elastic forces of the engaging jaws 20 owing to the elasticity of their elastic material, which elastic forces act on the surfaces of the cutouts 36 in a lateral direction parallel to the bearing surface 32. Accordingly, the jaws 20 are freely movable relative to the top wall portion 33 of the mounting bracket 30 in the above-indicated lateral direction away from the cutout 36, when a compressive load is applied to the stabilizer bushing 10 in the vertical direction. Thus, the jaws 20 are arranged to effectively prevent a stress concentration on the mounting surface 14 and a consequent problem of cracking or other damage, thereby assuring improved durability of the stabilizer bushing 10.

In the present stabilizer bushing 10, the hook portions 24 of the engaging jaws 20 formed integrally with the elastic body 11 have the slant end surfaces 26 on their inner sides nearer to the central portion of the mounting surface 14. These slant end surfaces 26 permit easier engagement of the jaws 20 with the engaging portions in the form of the arcuate cutouts 36 formed on the mounting bracket 30, thereby facilitating the operation to assemble the stabilizer bushing 10 and the mounting bracket 30. In addition, the arcuate configuration of the cutouts 36 also contributes to easier engagement between the hook portions 24 and the cutouts 36.

It is also appreciated that the reinforcing block 28 formed as an integral part of the elastic body 11 is formed integrally with the leg portion 22 of each engaging jaw 20. This reinforcing block 28 is effective to reinforce the jaw 20 so as to prevent plastic deformation of the jaw 20, so that the stabilizer bushing 10 and the mounting bracket 30 are assembled together with high stability under the elastic force of the jaw 20 reinforced by the reinforcing block 28.

In addition, the four engaging jaws 20 are formed at the respective four corner portions of the rectangular mounting surface 14, such that the hook portions 24 of the jaws 20 are engageable with the respective four engaging portions in the form of the four arcuate cutouts 36 formed at the respective four corner portions of the rectangular top wall portion 33 of the mounting bracket 30, so that the stabilizer bushing 10 is fixed to the mounting bracket 30 at the four positions, such that the four engaging jaws 20 hold the top wall portion 33 in the inward direction parallel to the bearing surface 32. Accordingly, the stabilizer bushing 10 can be fixed to the mounting bracket 30 with increased stability, so as to prevent easy separation of the stabilizer bushing 10 and the mounting bracket 30 from each other, so that the handling of the assembly of the bushing 10 and bracket 20 can be facilitated.

While the present invention has been described above in detail in its preferred or typical exemplary embodiment, it is to be understood that the invention is not limited to the details of the illustrated embodiment.

For instance, the configurations and structural arrangements of the vibration damping bushing and the mounting bracket according to the present invention are not limited to those of the stabilizer bushing 10 and the mounting bracket 30 in the illustrated embodiment, but may be modified as needed, provided that the bushing and the mounting bracket can be fixed together into an assembly, according to the principle of this invention.

Although the elastic body 11 of the stabilizer bushing 10 in the illustrated preferred embodiment has the four engaging jaws 20 formed at the respective four corner portions of the lower mounting surface 14, the number of the engaging jaws 20 may be suitably determined, depending upon the configuration (as seen in FIG. 5B) of the top wall portion 33 of the mounting bracket 30, provided that the two or more jaws 20 are provided so as to hold the top wall portion 33 in the laterally inward direction of the top wall portion 33.

Further, the configurations and structural arrangements of the engaging jaws 20 and the engaging portions (cutouts 36) of the mounting bracket 30 may be modified as needed, provided that the engaging jaws and the engaging portions are engageable with each other, so as to prevent a stress concentration on the mounting surface 14 of the elastic body 11 during use of the stabilizer bushing 10.

While the vibration damping bushing in the form of the stabilizer bushing 10 has been described above as the preferred embodiment of the present invention, the principle of this invention is equally applicable to various types of vibration damping bushing used on vehicles and for various other applications.

It is to be understood that the present invention may be embodied with various other changes, modifications and improvements, which may occur to those skilled in the art, without departing from the spirit and scope of the invention defined in the following claims.

What is claims is:

1. A vibration damping bushing including an elastic body of generally cylindrical shape formed of an elastic material and having a bore through which there is inserted a shaft member whose vibration is to be damped, and an outer mounting surface which extends in an axial direction of the elastic body and at which said elastic body is fixed to a mounting bracket, said vibration damping bushing comprising:

a plurality of engaging jaws formed integrally with said elastic body, on respective peripheral portions of said outer flat mounting surface of said elastic body, such that said engaging jaws extend from said mounting surface and are elastically engageable with respective engaging portions of said mounting bracket, so that said elastic body is fixed to said mounting bracket.

2. A vibration damping bushing according to claim 1, wherein said outer flat mounting surface of said elastic body consists of a generally rectangular surface, and said plurality of engaging jaws consist of four engaging jaws formed at respective four corner portions of said generally rectangular surface.

3. A vibration damping bushing according to claim 1, wherein each of said engaging jaws includes a leg portion formed integrally with said elastic body, so as to extend from said outer flat mounting surface, and a hook portion extending from a free end face of said leg portion, said hook portion having a free end face inclined at a portion thereof on an inner side of said mounting surface, to provide a slant surface which is inclined toward said mounting surface as said slant surface extends inwardly of said mounting surface as seen in a plane parallel to said mounting surface, said hook portion being engageable with a corresponding one of said engaging portions of said mounting bracket, by a relative movement of said each engaging jaw and said corresponding one engaging portion while said slant surface is in sliding contact with a surface of said corresponding one engaging portion.

4. A vibration damping bushing according to claim 3, wherein said each engaging jaw further includes a reinforcing block formed integrally with said elastic body and said leg portion, so as to reinforce said leg portion, and said hook portion is formed on only said free end face of said leg portion.

5. A vibration damping bushing according to claim 1, wherein said elastic body of generally cylindrical shape has an outer surface cooperating with said outer flat mounting surface to define an outer profile as seen in a plane perpendicular to said axial direction, said elastic body further having an internal slit formed therethrough in a radial direction thereof, so as to extend in parallel with said outer flat mounting surface, between an inner circumferential surface of said bore and said outer surface, said internal slit being formed over an entire axial length of said elastic body.

6. A vibration damping bushing according to claim 1, wherein said shaft member consists of a stabilizer bar provided on an automotive vehicle, and the vibration damping bushing serves as a stabilizer bushing.

7. A vibration damping bushing according to claim 1, wherein said plurality of engaging jaws of said elastic body are positioned relative to each other and dimensioned such that said engaging jaws are elastically deformed in sliding contact with surfaces of said engaging portions of said mounting bracket, when said elastic body and said mounting bracket are moved toward each other in a direction perpendicular to said outer flat mounting surface, for engagement of said engaging jaws with said respective engaging portions.

8. An assembly consisting of a vibration damping bushing as defined in claim 1 and a mounting bracket having a plurality of engaging portions with which said plurality of engaging jaws are engageable, so that said elastic body and said mounting bracket are fixed to each other.

9. An assembly according to claim 8, wherein said mounting bracket consists of a top wall portion and a pair of supporting leg portions, said top wall portion having a bearing surface for contact with said outer flat mounting surface of said elastic body, and a generally rectangular shape as seen in a first plane parallel to said outer flat mounting surface, each of said pair of L-shaped supporting leg portions being L-shaped as seen in a second plane perpendicular to said first plane, said pair of L-shaped supporting leg portions extending from respective opposite ends of said top wall portion, in a symmetric relation with each other, said each said L-shaped supporting leg portion consisting of a vertical section extending downwards from a corresponding one of said opposite ends of said top wall portion, as seen in said second plane, and a horizontal section extending from a free end of said vertical section such that the horizontal sections of said pair of L-shaped supporting leg portions extend in opposite directions away from each other, in parallel with said top wall portion, said plurality of engaging portions consisting of four engaging portions formed at respective four corners of said top wall portion.

10. An assembly according to claim 9, wherein said four engaging portions consist of four arcuate cutouts formed at said respective four corners of said top wall portion, and said plurality of engaging jaws of said elastic body consist of four engaging jaws which are held in engagement with said four arcuate cutouts, respectively, such that a free end portion of each of said four engaging jaws is partially located inwardly of a corresponding one of said arcuate cutouts as seen in said first plane, and is held in contact with a part of a surface of said top wall portion opposite to said bearing surface, which part is adjacent to said corresponding one arcuate cutout.

11. An assembly according to claim 8, wherein said shaft member consists of a stabilizer bar provided on an automotive vehicle, and the vibration damping bushing serves as a stabilizer bushing.

* * * * *